United States Patent
Wang et al.

(10) Patent No.: US 9,894,112 B2
(45) Date of Patent: Feb. 13, 2018

(54) VIDEO MEDIA PLAYING METHODS, APPARATUSES AND SYSTEMS, AND COMPUTER STORAGE MEDIUM

(71) Applicant: ZTE CORPORATION, Shenzhen (CN)

(72) Inventors: Chengcan Wang, Shenzhen (CN); Jingnan Ha, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 15/322,144

(22) PCT Filed: Dec. 11, 2014

(86) PCT No.: PCT/CN2014/093619
§ 371 (c)(1),
(2) Date: Dec. 26, 2016

(87) PCT Pub. No.: WO2015/196751
PCT Pub. Date: Dec. 30, 2015

(65) Prior Publication Data
US 2017/0163695 A1 Jun. 8, 2017

(30) Foreign Application Priority Data

Jun. 26, 2014 (CN) .......................... 2014 1 0295051

(51) Int. Cl.
*H04W 4/16* (2009.01)
*H04W 4/20* (2009.01)
(Continued)

(52) U.S. Cl.
CPC .... *H04L 65/1096* (2013.01); *H04M 3/42017* (2013.01); *H04W 4/16* (2013.01); *H04W 4/20* (2013.01)

(58) Field of Classification Search
CPC ........... H04W 4/12; H04W 4/14; H04W 4/16; H04W 4/18
(Continued)

(56) References Cited

FOREIGN PATENT DOCUMENTS

CN 1750569 3/2006
CN 102131009 7/2011
(Continued)

OTHER PUBLICATIONS

International Search Report for PCT/CN2014/093619, English Translation attached to original, Both completed by the Chinese Patent Office on Mar. 24, 2015, All together 5 Pages.
(Continued)

*Primary Examiner* — Sam Bhattacharya
(74) *Attorney, Agent, or Firm* — Plumsea Law Group, LLC

(57) ABSTRACT

Methods, apparatuses and systems for playing video media, and a computer storage medium are described. The method applied to a network side includes: receiving an audio call request from a calling terminal; acquiring video media information that needs to be played in a current call; and playing the video media for the calling terminal. The method applied to a terminal side includes: sending an audio call request to a network side; and receiving and playing video media from the network side. The apparatus applied to a network side includes: a receiving module arranged to receive an audio call request from a calling terminal; an acquisition module arranged to acquire video media information that needs to be played in a current call; and an execution module arranged to play the vide media for the calling terminal.

16 Claims, 9 Drawing Sheets

(51) Int. Cl.
*H04L 29/06* (2006.01)
*H04M 3/42* (2006.01)

(58) Field of Classification Search
USPC ............... 455/412.1, 412.2, 414.1–414.4
See application file for complete search history.

(56) References Cited

FOREIGN PATENT DOCUMENTS

| | | |
|---|---|---|
| CN | 102724640 | 10/2012 |
| CN | 104105080 | 10/2014 |
| EP | 2249554 | 11/2010 |
| EP | 2299671 | 3/2011 |

OTHER PUBLICATIONS

Extend European Search Report for EP 14895641.0, completed by the European Patent Office on May 26, 2017 All together 9 Pages.
Sipping, B. Stucker, 24 Pages Oct. 18, 2006, "Coping with Early Media in the Session Initiation Proocol (SIP) draft-stucker-sipping-early-media-coping-03".

US 9,894,112 B2

VIDEO MEDIA PLAYING METHODS, APPARATUSES AND SYSTEMS, AND COMPUTER STORAGE MEDIUM

CROSS-REFERENCE TO RELATED APPLICATIONS

This application is the U.S. national phase of PCT Application No. PCT/CN2014/093619 filed on Dec. 11, 2014, which claims priority to Chinese Patent Application No. 201410295051.1 filed on Jun. 26, 2014, the disclosures of which are incorporated in their entirety by reference herein.

TECHNICAL FIELD

The present document relates to the field of multimedia services, in particular to a method, apparatus and system for playing video media, and a computer storage medium.

BACKGROUND OF THE RELATED ART

Multimedia coloring ring back tone is a service customized by a called user for providing an individualized audio or video segment for a calling user to replace a toneless ring back tone. GATEWAY mode refers to using the same session to transmit early media and conversation media, for negotiating about early media before a conversation and for negotiating about conversation media after a user hook-off. Early-Session mode refers to establishing two independent sessions respectively for transmitting the early media and the conversation media by the user, so as to quickly switch to the conversation media after the user answers. With the development of the broadband technology and the mature application of the 3G and 4G radio communication technologies, especially the use of a great number of video terminals, it provides a wide development space for the multimedia coloring ring back tone.

Although video terminals become increasingly popular, in light of the relatively high cost of video conversation and the matter of user habits, times that users make video calls are very few, and thus it is very difficult to achieve a very good popularization effect for video coloring ring back tone.

SUMMARY

In view of this, in order to solve the existing technical problem, an embodiment of the present document provides:

a method for playing video media, applied to a network side, including:

receiving an audio call request from a calling terminal;
acquiring video media information that needs to be played in a current call; and
playing video media for the calling terminal.

In a specific embodiment, said receiving an audio call request from a calling terminal includes:

receiving a call request from the calling terminal, wherein the call request carries media information, and the media information is audio media information, and said playing video media for the calling terminal includes:

sending a first message to the calling terminal, wherein the first message carries unreal audio media information;

sending a second message to the calling terminal, wherein the second message carries the video media information that needs to be played in the current call;

receiving a third message from a terminal, wherein the third message carries media information, and the media information is video media information; and playing the video media that needs to be played for the terminal.

In a specific embodiment, said sending a first message to the calling terminal includes:

after receiving the call request from the calling terminal, directly sending the first message to the calling terminal, or after connecting a called terminal according to the call request from the calling terminal, sending the first message to the calling terminal.

In a specific embodiment, said acquiring video media information that needs to be played in a current call includes:

acquiring the video media information that needs to be played in the current call by querying a preset video media playing policy according to one or more of the following:

a calling number, a called number, a current date, and a current time.

In a specific embodiment, the first message is a 183 message, the second message is an UPDATE message, and the third message is a 200 OK UPDATE message.

In a specific embodiment, the method further includes:

stopping playing the video media when a conversation is established, and/or stopping playing the video media according to a playing stop request from the calling terminal.

An embodiment of the present document further provides a method for playing video media, applied to a terminal side, including:

sending an audio call request to a network side; and
receiving and playing video media from the network side.

In a specific embodiment, said sending an audio call request to a network side includes:

sending a call request to the network side, wherein the call request carries media information, and the media information is audio media information, and before receiving and playing video media from the network side, the method further includes:

receiving a first message from the network side, wherein the first message carries unreal audio media information;

receiving a second message from the network side, wherein the second message carries video media information that needs to be played in a current call; and sending a third message to the network side, wherein the third message carries media information, and the media information is video media information.

In a specific embodiment, the first message is a 183 message, the second message is an UPDATE message, and the third message is a 200 OK UPDATE message.

In a specific embodiment, the method further includes:

sending a playing stop request to the network side according to a user operation.

An embodiment of the present document further provides a method for playing video media, including:

playing, by a terminal side, video media according to the above method applied to the terminal side; and controlling, by a network side, the terminal side to play the video media according to the above method applied to the network side.

An embodiment of the present document further provides an apparatus for playing video media, arranged on a network side, including: a receiving module, an acquisition module and an execution module, wherein, the receiving module is arranged to receive an audio call request from a calling terminal;

the acquisition module is arranged to acquire video media information that needs to be played in a current call; and the execution module is arranged to play the video media for the calling terminal.

In a specific embodiment, the apparatus further includes a sending module;

the receiving module is arranged to: receive a call request from the calling terminal, wherein the call request carries media information, and the media information is audio media information; and receive a third message from a terminal, wherein the third message carries media information, and the media information is video media information;

the sending module is arranged to, after the receiving module receives the call request from the calling terminal, send a first message to the calling terminal, wherein the first message carries unreal audio media information; and send a second message to the calling terminal, wherein the second message carries the video media information that needs to be played in the current call; and the execution module is arranged to, after the receiving module receives the third message from the terminal, play the video media that needs to be played for the terminal.

In a specific embodiment, the sending module is arranged to, after the receiving module receives the call request from the calling terminal, directly send the first message to the calling terminal, or after connecting a called terminal according to the call request from the calling terminal, send the first message to the calling terminal.

In a specific embodiment, the acquisition module is arranged to acquire the video media information that needs to be played in the current call by querying a preset video media playing policy according to one or more of the following: a calling number, a called number, a current date, and a current time.

In a specific embodiment, the first message sent by the sending module is a 183 message, the second message is an UPDATE message, and the third message received by the receiving module is a 200 OK UPDATE message.

In a specific embodiment, the execution module is further arranged to stop playing the video media when a conversation is established, or, the receiving module is further arranged to receive a playing stop request from the calling terminal; and the execution module is further arranged to stop playing the video media according to the playing stop request from the calling terminal.

An embodiment of the present document provides an apparatus for playing video media, arranged on a terminal side, including: a sending module and an execution module, wherein, the sending module is arranged to send an audio call request to a network side; and the execution module is arranged to receive and play video media from the network side.

In a specific embodiment, the apparatus further includes a receiving module;

the sending module is arranged to: send a call request to the network side, wherein the call request carries media information, and the media information is audio media information; and, after receiving a second message from the network side, send a third message to the network side, wherein the third message carries media information, and the media information is video media information; and the receiving module is arranged to: receive a first message from the network side, wherein the first message carries unreal audio media information; and receive the second message from the network side, wherein the second message carries video media information that needs to be played in a current call.

In a specific embodiment, the first message received by the receiving module is a 183 message, and the second message is an UPDATE message; and the third message sent by the sending module is a 200 OK UPDATE message.

In a specific embodiment, the apparatus further includes a user interaction module;

the user interaction module is arranged to acquire user operation information; and the sending module is further arranged to send a playing stop request to the network side according to a user operation.

An embodiment of the present document further provides a system for playing video media, the system including an apparatus for playing video media on a network side and an apparatus for playing video media on a terminal side, wherein, the apparatus for playing video media on the network side is the above apparatus for playing video media arranged on the network side; and the apparatus for playing video media on the terminal side is the above apparatus for playing video media arranged on the terminal side.

An embodiment of the present document further provides a computer storage medium, storing computer-executable instructions used for executing the above methods.

The embodiments of the present document provide a method, apparatus and system for playing the video media and a computer storage media, in which an audio call request from a calling party terminal is received; video media information that needs to be played in a current call is acquired; and the video media is played for the calling terminal. Through the embodiments of the present document, it is realized of playing a video coloring ring back tone to a user when the user makes a voice call, thereby improving the application scope of the video coloring ring back tone.

EMBODIMENTS OF THE PRESENT DOCUMENT

In various embodiments of the present document, an audio call request from a calling terminal is received; video media information that needs to be played in a current call is acquired; and video media is played for the calling terminal.

Figure 1:
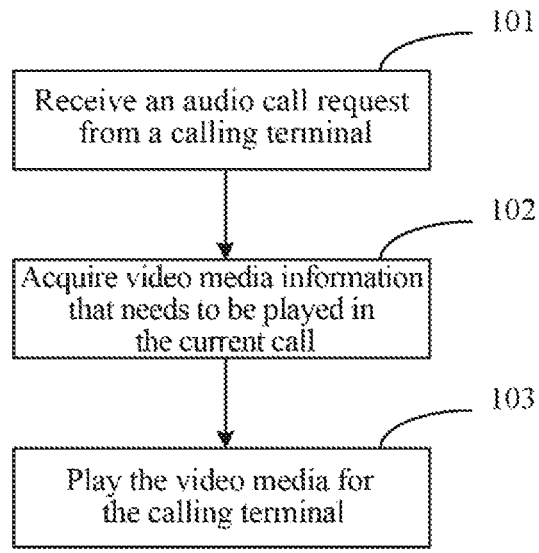
FIG. 1 is a flowchart of a method for playing video media applied to a network side, according to an embodiment of the present document.

FIG. 1 is a flowchart of a method for playing video media applied to a network side according to an embodiment of the present document, and as illustrated in FIG. 1, the method includes that:

in step 101, an audio call request from a calling terminal is received;

in step 102, video media information that needs to be played in a current call is acquired;

in step 103, the video media is played for the calling terminal;

In one specific embodiment, the step 101 that an audio call request from a calling party terminal is received includes that:

a call request from the calling terminal is received, the call request carrying media information, the media information being audio media information, and the step 103 that the video media is played for the calling party terminal includes that:

a first message is sent to the calling terminal, the first message carrying unreal audio media information;

a second message is sent to the calling terminal, the second message carrying video media information that needs to be played in the current call;

a third message from a terminal is received, the third message carrying media information, the media information being video media information; and the video media that needs to be played is played for the terminal.

In one specific embodiment, a first message being sent to the calling terminal includes that:

after the call request from the calling terminal is received, the first message is directly sent to the calling terminal, or after a called terminal is connected according to the call request from the calling terminal, the first message is sent to the calling terminal.

In one specific embodiment, the video media information that needs to be played in the current call being acquired includes that:

the video media information that needs to be played in the current call is acquired by querying a preset video media playing policy according to one or more of the following:

a calling number, a called number, a current date and a current time.

In one specific embodiment, the first message is a 183 message, the second message is an UPDATE message and the third message is a 200 OK UPDATE message.

In one specific embodiment, the method further includes that:

playing the video media is stopped when a conversation is established, and/or playing the video media is stopped according to a playing stop request from the calling terminal.

Figure 2:
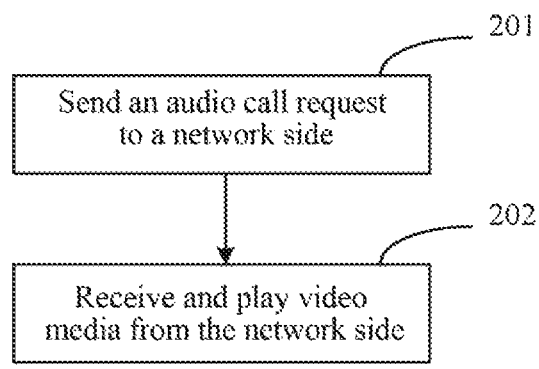
FIG. 2 is a flowchart of a method for playing video media applied to a terminal side according to an embodiment of the present document.

An embodiment of the present document further correspondingly provides a method for playing video media applied to a terminal side, and as illustrated in FIG. 2, the method includes that:

in step 201, an audio call request is sent to a network side;

in step 202, video media from the network side is received and played.

In one specific embodiment, the step 201 that an audio call request is sent to a network side includes that:

a call request is sent to the network side, the call request carrying media information, the media information being audio media information, and before the step 202 that video media from the network side is received and played, the method further includes that:

a first message from the network side is received, the first message carrying unreal audio media information;

a second message from the network side is received, the second message carrying video media information that needs to be played in a current call; and a third message is sent to the network side, the third message carrying media information, the media information being video media information.

In one specific embodiment, the first message is a 183 message, the second message is an UPDATE message and the third message is a 200 OK UPDATE message.

In one specific embodiment, the method further includes that:

a playing stop request is sent to the network side according to a user operation.

An embodiment of the present document further correspondingly provides a method for playing video media, the method including that:

a terminal side plays video media according to the method for playing video media applied to the terminal side; and a network side controls the terminal side to play video media according to the method for playing video media applied to the network side.

Figure 3:
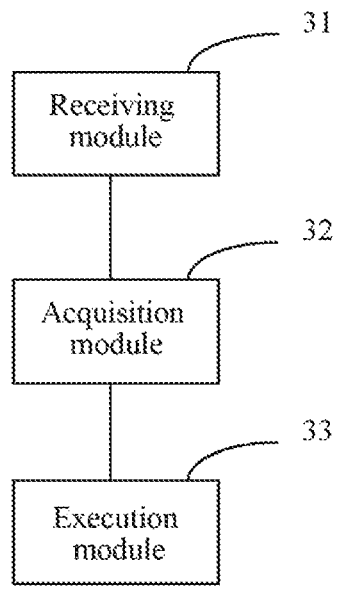
FIG. 3 is a schematic diagram of a structure of an apparatus for playing video media arranged on a network side according to an embodiment of the present document.

An embodiment of the present document further correspondingly provides an apparatus for playing video media arranged on a network side, and as illustrated in FIG. 3, the apparatus includes: a receiving module 31, an acquisition module 32 and an execution module 33, wherein, the receiving module 31 is arranged to receive an audio call request from a calling terminal;

the acquisition module 32 is arranged to acquire video media information that needs to be played in a current call; and the execution module 33 is arranged to play the video media for the calling terminal.

Figure 4:
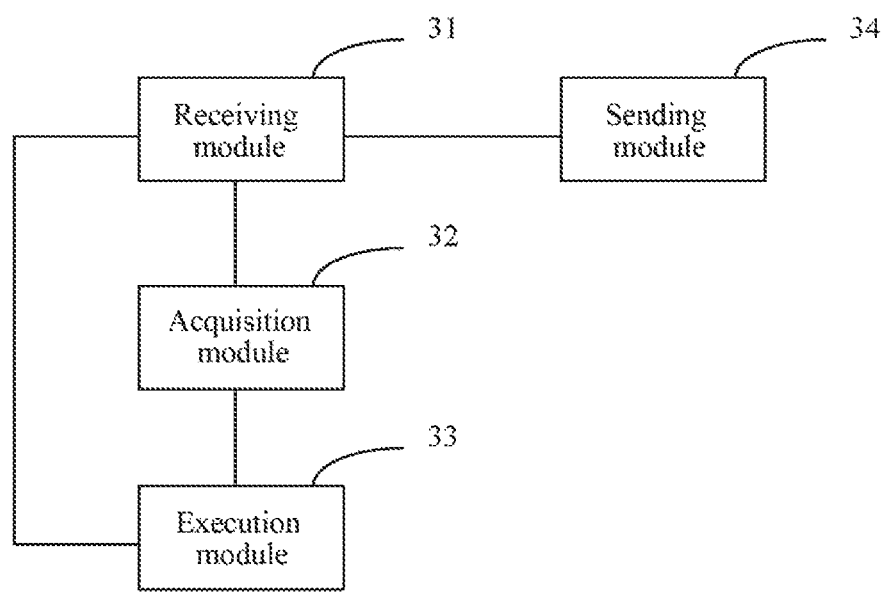
FIG. 4 is a schematic diagram of a structure of another apparatus for playing video media arranged on a network side according to an embodiment of the present document.

In one specific embodiment, as illustrated in FIG. 4, the apparatus further includes a sending module 34;

the receiving module 31 is specifically arranged to: receive a call request from the calling terminal, the call request carrying media information, the media information being audio media information; and receive a third message from a terminal, the third message carrying media information, the media information being video media information;

the sending module 34 is arranged to: after the receiving module receives the call request from the calling terminal, send a first message to the calling terminal, the first message carrying unreal audio media information; and send a second message to the calling terminal, the second message carrying video media information that needs to be played in the current call; and the execution module 33 is specifically arranged to, after the receiving module receives the third message from the terminal, play the video media that needs to be played for the terminal.

In one specific embodiment, the sending module 34 is specifically arranged to, after the receiving module 31 receives the call request from the calling terminal, directly send the first message to the calling terminal, or after connecting a called terminal according to the call request from the calling terminal, send the first message to the calling terminal.

In one specific embodiment, the acquisition module 32 is specifically arranged to acquire the video media information that needs to be played in the current call by querying a preset video media playing policy according to one or more of the following: a calling number, a called number, a current date and a current time.

In one specific embodiment, the first message sent by the sending module 34 is a 183 message, the second message is an UPDATE message, and the third message received by the receiving module 31 is a 200 OK UPDATE message.

In one specific embodiment, the execution module 33 is further arranged to stop playing the video media when a conversation is established, or, the receiving module 31 is further arranged to receive a playing stop request from the calling terminal; and the execution module 33 is further arranged to stop playing the video media according to the playing stop request from the calling terminal.

Figure 5:
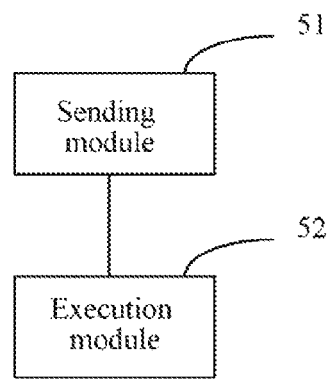
FIG. 5 is a schematic diagram of a structure of an apparatus for playing video media arranged on a terminal side according to an embodiment of the present document.

An embodiment of the present document further correspondingly provides an apparatus for playing video media arranged on a terminal side, and as illustrated FIG. 5, the apparatus includes: a sending module 51 and an execution module 52, wherein, the sending module 51 is arranged to send an audio call request to a network side; and the execution module 52 is arranged to receive and play video media from the network side.

Figure 6:
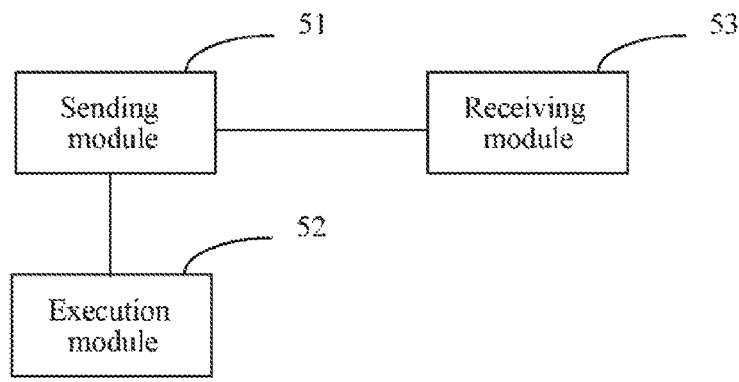
FIG. 6 is a schematic diagram of a structure of another apparatus for playing video media arranged on a terminal side according to an embodiment of the present document.

In one specific embodiment, as illustrated in FIG. 6, the apparatus further includes a receiving module 63;

the sending module 51 is specifically arranged to: send a call request to the network side, the call request carrying media information, the media information being audio media information; and after receiving a second message from the network side, send a third message to the network side, the third message carrying media information, the media information being video media information; and the receiving module 53 is arranged to receive a first message from the network side, the first message carrying unreal audio media information; and receive the second message from the network side, the second message carrying video media information that needs to be played in a current call.

In one specific embodiment, the first message received by the receiving module 53 is a 183 message and the second message is an UPDATE message; and the third message sent by the sending module 51 is a 200 OK UPDATE message.

Figure 7:
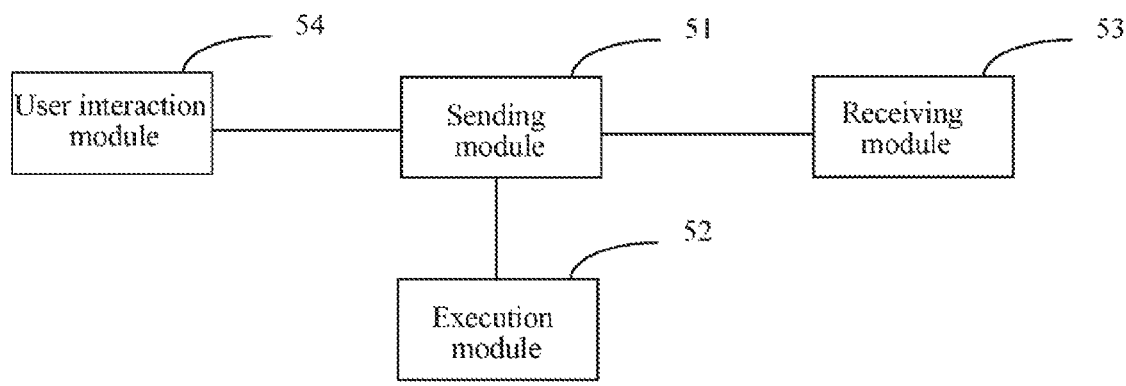
FIG. 7 is a schematic diagram of a structure of another apparatus for playing video media arranged on a terminal side according to an embodiment of the present document.

In one specific embodiment, as illustrated in FIG. 7, the apparatus further includes a user interaction module 54;

the user interaction module 54 is arranged to acquire user operation information; and the sending module 51 is further arranged to send a playing stop request to the network side according to a user operation.

An embodiment of the present document further correspondingly provides a system for playing video media, the system including an apparatus for playing video media on a network side playing and an apparatus for playing video media on a terminal side, wherein, the apparatus for playing video media on the network side is the above apparatus for playing video media arranged on the network side; and the apparatus for playing video media on the terminal side is the above apparatus for playing video media arranged on the terminal side.

It needs to be stated that the video media in the embodiments of the present document may be video media without voice and may also be video media with voice.

The above-mentioned embodiments may be applied to the field of multimedia coloring ring services, and specifically, various legitimate advertisements such as product propagation advertisements and enterprise image advertisements may be made into multimedia video segments for subscription, setting and use by coloring ring subscribers. It may also be favorite pop music MV or movie episodes of users.

An embodiment of the present document further correspondingly provides a computer storage media, storing computer-executable instructions used for executing the method according to any one of the method embodiments.

The technical solutions of the present document will be further expounded below through specific embodiments.

Embodiment 1

The purpose of this embodiment is to provide a solution for viewing/listening to a multimedia coloring ring back tone in an audio call, so as to enable greater audience for video coloring ring back tone.

Figure 8:
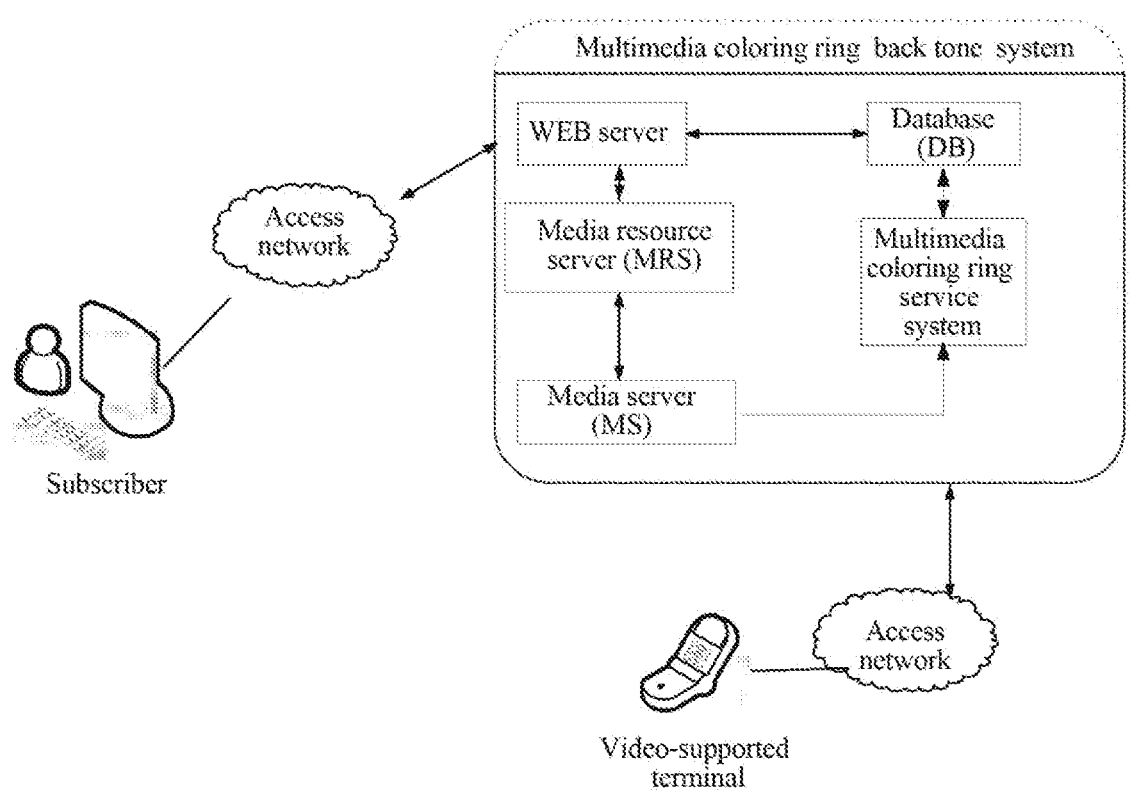
FIG. 8 is a networking structural diagram of a system in Embodiment 1 of the present document.

FIG. 8 is a networking structural diagram of a system in Embodiment 1 of the present document, and as illustrated in FIG. 8, a multimedia video coloring ring back tone system mainly includes: a WEB server, a Media Server (MS) and a Multimedia Coloring Ring Application Server, wherein the Multimedia Coloring Ring Application Server is responsible for processing service logic and signaling control, the MS is responsible for storing and playing audio and video coloring ring back tone, and the WEB server is responsible for processing opening and cancellation of user accounts and ring tone uploading, and processing subscription logic.

Figure 9:
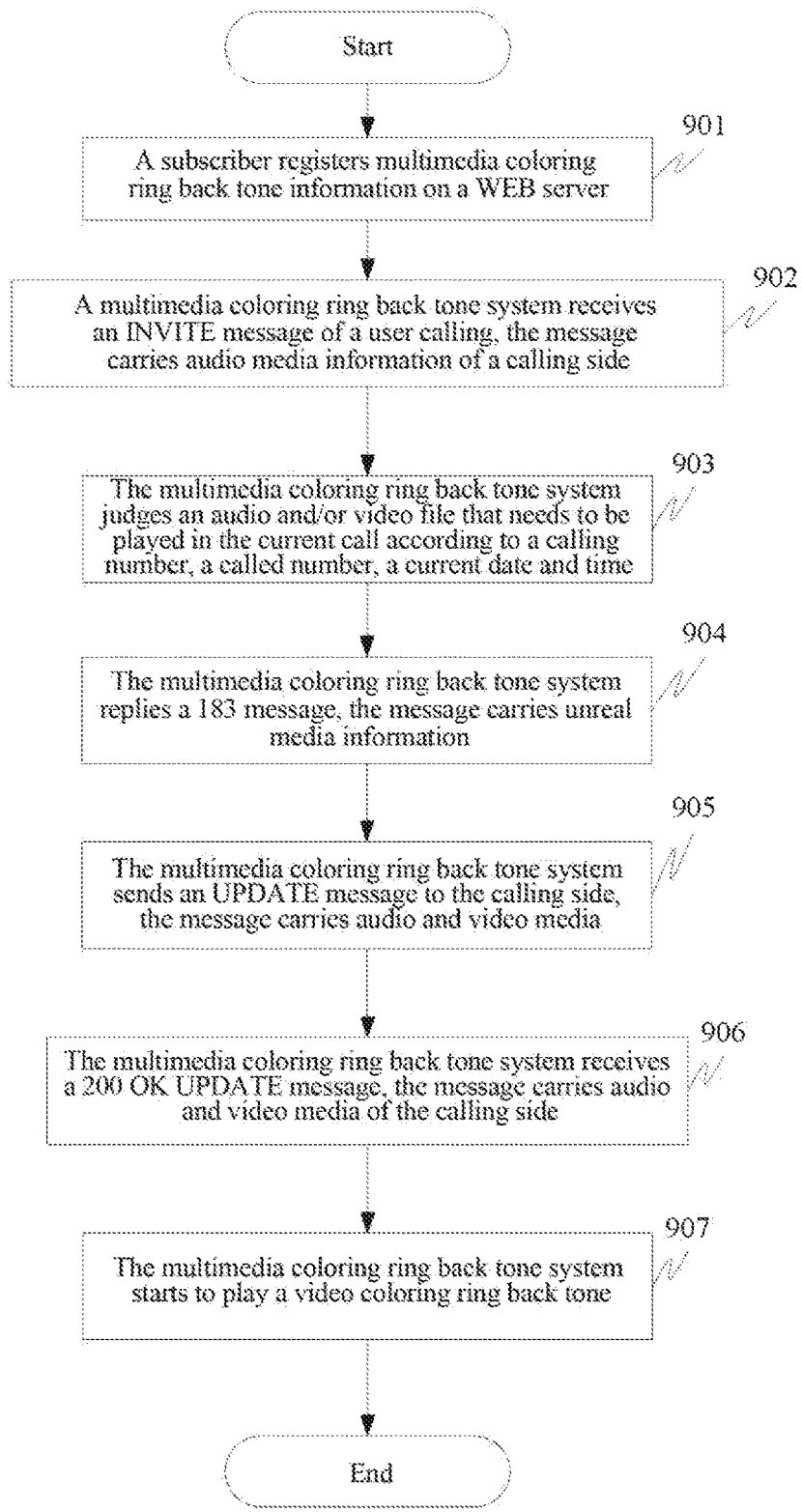
FIG. 9 is a flowchart of a call processing procedure in Embodiment 1 of the present document.

FIG. 9 is a flowchart of a call processing procedure in Embodiment 1 of the present document, and as illustrated in FIG. 9, the procedure includes that:

In step 901, a subscriber initiates an operation of subscribing a multimedia coloring ring back tone through a WEB server.

In step 902, a multimedia coloring ring back tone system receives an INVITE message initiated by a calling party, the message carrying audio media information from a calling side.

In step 903, the multimedia coloring ring back tone system obtains audio and video coloring ring tone file information played in a current call according to the calling party, a called party and time period information.

In step 904, the multimedia coloring ring back tone system replies a 183 message, the message carrying unreal audio media information. The unreal media information is generally implemented by using a unreal media address or inactive media.

In step 905, the multimedia coloring ring back tone system sends an UPDATE message, the message carrying audio and video media.

In step 906, the multimedia coloring ring back tone system receives a 200 OK UPDATE message replied by the calling side, the message carrying audio and video media information from the calling side.

A playing key of audio call to video coloring ring back tone in this embodiment of the present document is completed through steps 905 and 906.

Step 907, the multimedia coloring ring back tone system starts to play the video coloring ring back tone.

Embodiment 2

Figure 10:
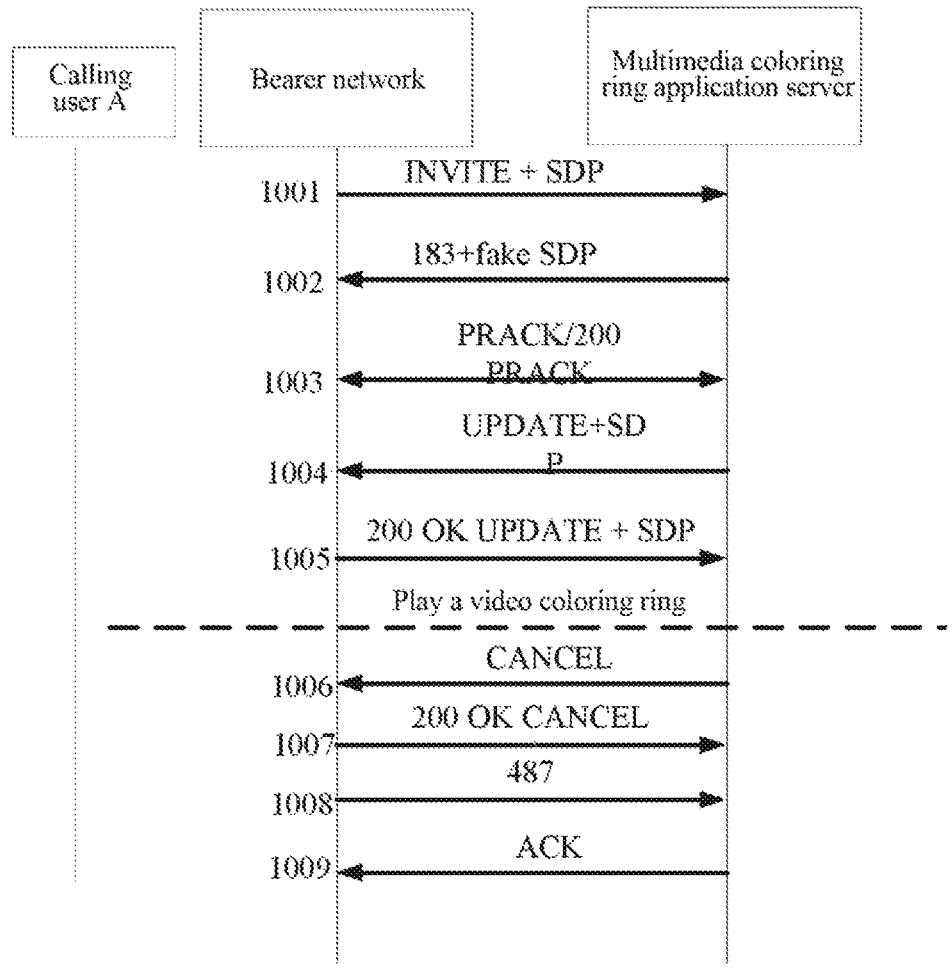
FIG. 10 is a flowchart of a call signaling when a coloring ring back tone system in a gateway mode is not responsible for connecting a called party according to Embodiment 2 of the present document.

FIG. 10 is a call signaling flowchart when a coloring ring back tone system in a gateway mode is not responsible for connecting a called party according to Embodiment 2 of the present document, and as illustrated in FIG. 10, the specific process includes the following steps:

In step 1001, a multimedia coloring ring back tone system receives an INVITE message from a calling side, the message carrying audio media information from the calling side.

In step 1002, the multimedia coloring ring back tone system replies a 183 message, the message carrying unreal media information. If the calling side supports 100rel, then there is step 1003 that the calling side sends a prack request message and the multimedia coloring ring back tone system sends a 200 PRACK response message; otherwise, step 1004 is executed.

In step 1004, the multimedia coloring ring back tone system sends an UPDATE message, the message carrying audio and video media information.

In step 1005, the multimedia coloring ring back tone system receives a 200 OK UPDATE message, the message carrying audio and video media information from the calling side. The multimedia coloring ring back tone system starts to play a video coloring ring back tone.

In steps 1006-1009, the multimedia coloring ring back tone system receives a quit request of playing the coloring ring back tone, stops playing the video coloring ring back tone and releases a session.

Embodiment 3

Figure 11:
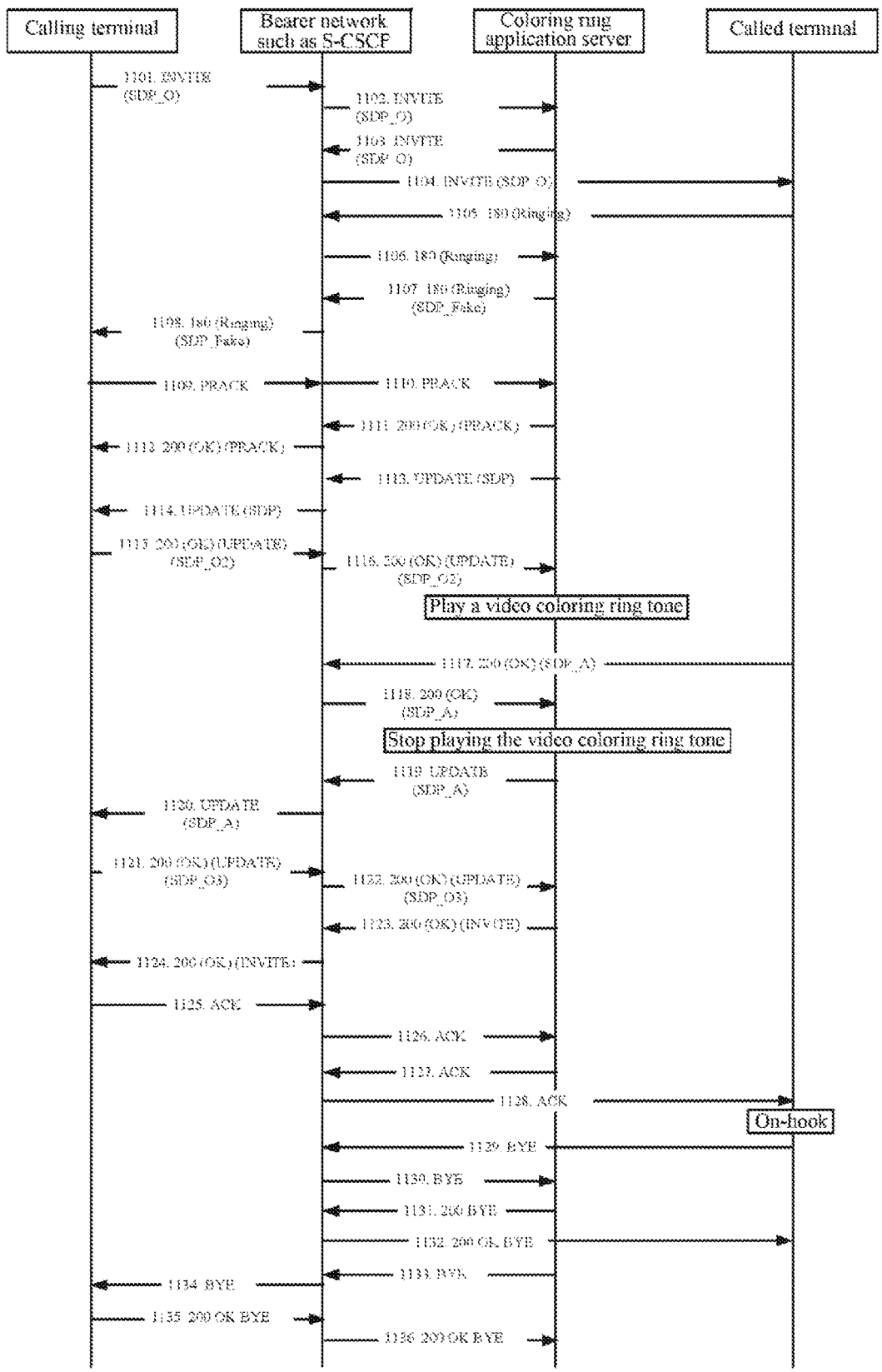
FIG. 11 is a flowchart of a call signaling when a coloring ring back tone system in a gateway mode is responsible for connecting a called party according to Embodiment 3 of the present document.

FIG. 11 is a call signaling flowchart when a coloring ring back tone system in a gateway mode is responsible for connecting a called party according to Embodiment 3 of the present document, and as illustrated in FIG. 11, the specific process includes the following steps:

In steps 1101-1102, a multimedia coloring ring back tone system receives an INVITE message from a calling side, the message carrying audio media information (SDP_O) from the calling side.

In steps 1103-1104, the multimedia coloring ring back tone system calls a called terminal, the message carrying the audio media information (SDP_O) from the calling party.

In steps 1105-1106, the multimedia coloring ring back tone system receives a 180 message indicating ringing of the called party terminal.

In steps 1107-1108, the multimedia coloring ring back tone system sends to a calling terminal a 180 message of ringing back tone, the message carrying unreal media information (SDP_Fake). If the calling side supports 100rel, then there are steps 1109-1111 that the calling side sends a PRACK request message and the multimedia coloring ring back tone system sends a 200 PRACK response message; otherwise, steps 1112-1114 are executed.

In steps 1112-1114, the multimedia coloring ring back tone system sends an UPDATE message, the message carrying audio and video media information.

In steps 1115-1116, the multimedia coloring ring back tone system receives a 200 OK UPDATE message, the message carrying audio and video media information (SDP_O2) from the calling side. The multimedia coloring ring back tone system starts to play a video coloring ring back tone.

In steps 1117-1118, the multimedia coloring ring back tone system receives a 200 OK message replied by a terminal, the message carrying media information (SDP_A) from a called side. The multimedia coloring ring back tone system stops playing the video coloring ring back tone.

In steps 1119-1120, the multimedia coloring ring back tone system sends an UPDATE message, the message carrying the media information (SDP_A) from the called side.

In steps 1121-1122, the multimedia coloring ring back tone system receives a 200 OK UPDATE message from the calling side, the message carrying audio and video media information (SDP_O3) from the calling side.

In steps 1123-1124, the multimedia coloring ring back tone system sends a 200 OK INVITE message to the calling side.

In steps 1125-1128, the multimedia coloring ring back tone system receives an ACK message from the calling side. The ACK message is sent to the called side.

In steps 1129-1132, the multimedia coloring ring back tone system receives a BYE message of on-hook from the called side. A 200 OK BYE message is sent to the called side.

In steps 1133-1136, the multimedia coloring ring back tone system sends a BYE message to the calling side and receives a 200 OK BYE message.

Embodiment 4

Figure 12:
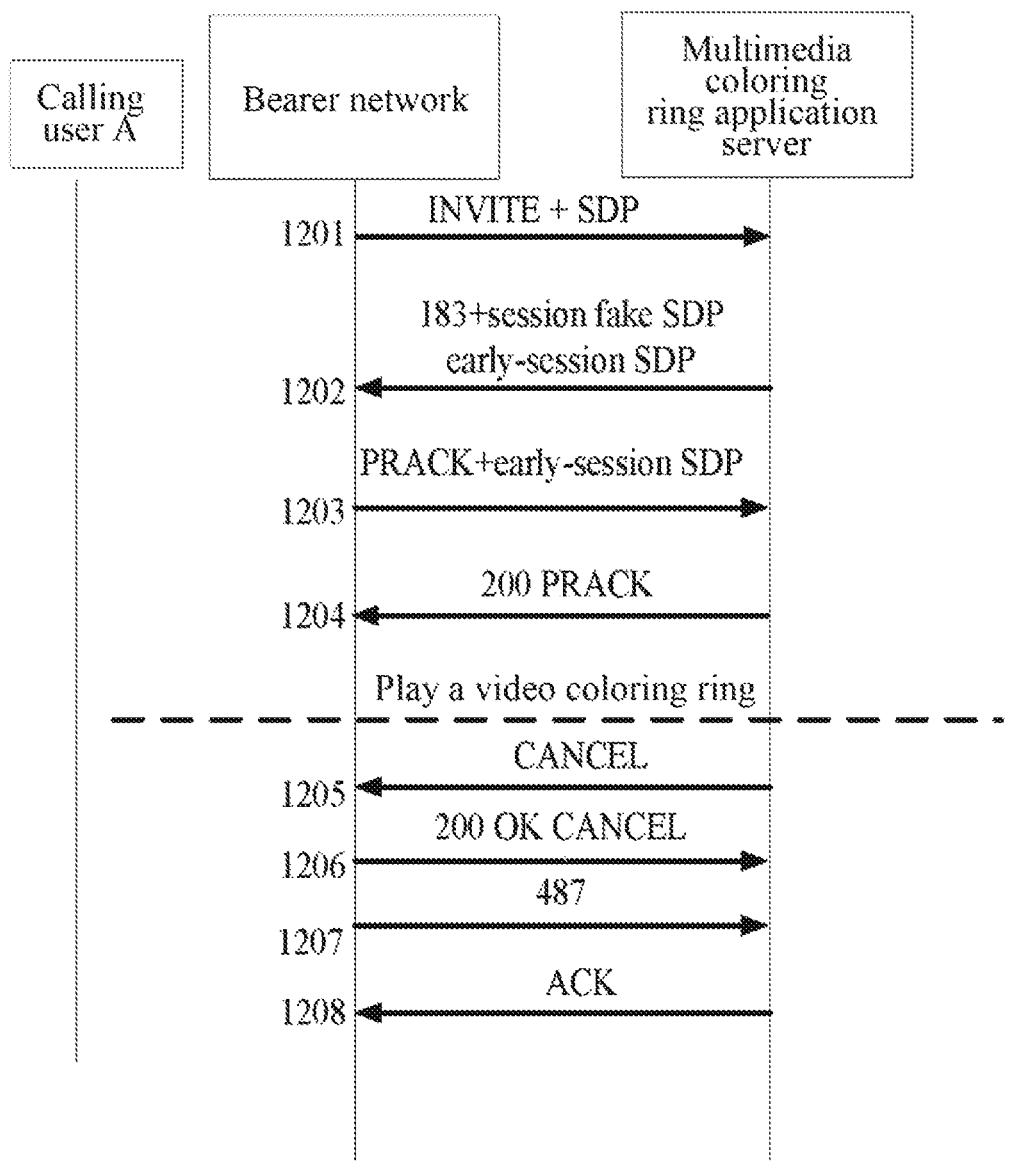
FIG. 12 is a flowchart of a call signaling when a coloring ring back tone system in an early-session mode is not responsible for connecting a called party according to Embodiment 4 of the present document.

FIG. 12 is a call signaling flowchart when a coloring ring back tone system in an early-session mode is not responsible for connecting a called party according to Embodiment 4 of the present document, and as illustrated in FIG. 12, the specific process includes the following steps:

In step 1201, a multimedia coloring ring back tone system receives an INVITE message from a calling side, the message carrying audio media information from the calling side.

In step 1202, the multimedia coloring ring back tone system replies a 183 message, the message carrying unreal media information in session and audio and video media in early-session.

In steps 1203-1204, the calling side sends a PRACK request message, the message carrying an early-session message body containing audio and video information from the calling side, and the multimedia coloring ring back tone system sends a 200 PRACK response message. The multimedia coloring ring back tone system starts to play a video coloring ring back tone.

In steps 1205-1208, the multimedia coloring ring back tone system receives a quit request of playing the coloring ring back tone, stops playing the video coloring ring back tone and releases a session.

Embodiment 5

Figure 13:
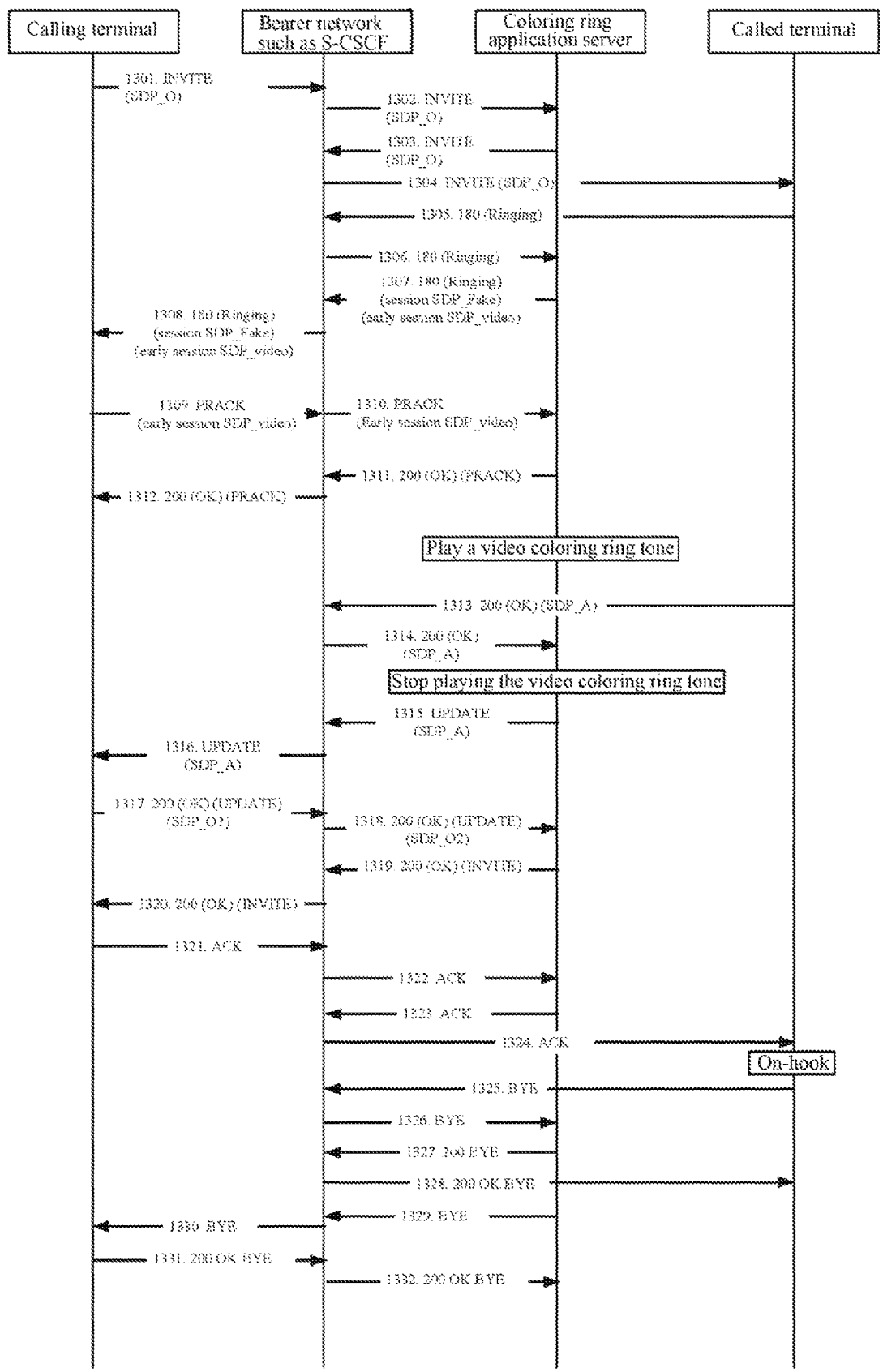
FIG. 13 is a flowchart of a call signaling when a coloring ring back tone system in an early-session mode is responsible for connecting a called party according to Embodiment 5 of the present document.

FIG. 13 is a call signaling flowchart when a coloring ring back tone system in an early-session mode is responsible for connecting a called party according to Embodiment 5 of the present document, and as illustrated in FIG. 13, the specific process includes the following steps:

In steps 1301-1302, a multimedia coloring ring back tone system receives an INVITE message from a calling side, the message carrying audio media information (SDP_O) from the calling party side.

In steps 1303-1304, the multimedia coloring ring back tone system calls a called party terminal, wherein the message carries the audio media information (SDP_O) from the calling party side.

In steps 1305-1306, the multimedia coloring ring back tone system receives a 180 message of ringing back tone from the called terminal.

In steps 1307-1308, the multimedia coloring ring back tone system sends a 180 message of ringing back tone to a calling terminal, the message carrying unreal media information (SDP_Fake) in session and audio and video media information of a coloring ring back tone in early-session.

In steps 1309-1311, the calling side sends a PRACK request message, the message carrying an early-session message body containing the audio and video information from the calling side, and the multimedia coloring ring back tone system sends a 200 PRACK response message. The multimedia coloring ring back tone system starts to play the video coloring ring back tone.

In steps 1313-1314, the multimedia coloring ring back tone system receives a 200 OK message replied by a terminal, the message carrying media information (SDP_A) from a called side. The multimedia coloring ring back tone system stops playing the video coloring ring back tone.

In steps 1315-1316, the multimedia coloring ring back tone system sends an UPDATE message, the message carrying the media information (SDP_A) from the called side.

In steps 1317-1318, the multimedia coloring ring back tone system receives a 200 OK UPDATE message from the calling side, the message carrying audio and video media information (SDP_O2) from the calling side.

In steps 1319-1320, the multimedia coloring ring back tone system sends a 200 OK INVITE message to the calling side.

In steps 1321-1324, the multimedia coloring ring back tone system receives an ACK message from the calling side. The ACK message is sent to the called side.

In steps 1325-1328, the multimedia coloring ring back tone system receives a BYE message of on-hook from the called side. The 200 OK BYE message is sent to the called side.

In steps 1329-1332, the multimedia coloring ring back tone system sends a BYE message to the calling side and receives a 200 OK BYE message.

Compared with the related art, the methods, apparatuses and systems for playing video media provided by the embodiments of the present document have the features of novel form, rich information and a wide range of users in terms of video support. In addition, the embodiments of the present document do not have special requirements on a bearer network, are relatively simple to implement and do not cause conflicts with the traditional supplementary services. The reconstruction overhead is not great but a very great convenience is provided for enterprises to promote products and propagate enterprise images.

All the above-mentioned modules may be implemented through a Central Processing Unit (CPU), a Digital Signal Processor (DSP) or a Field-Programmable Gate Array (FPGA) in an electronic device.

One skilled in the art shall understand that the embodiments of the present document may be provided in the form of methods, systems or computer program products. Therefore, the present document may adopt the form of hardware embodiments, software embodiments or embodiments with software and hardware combined. In addition, the present document may adopt the form of computer program products implemented on one or more of computer usable memory media (including but not limited to a disk memory and an optical memory) containing computer usable program codes therein.

The present document is described with reference to flowcharts and/or block diagrams of the methods, the apparatuses (systems) and the computer program products according to the embodiments of the present document. It should be appreciated that each process and/or block in the flowcharts and/or block diagrams and combinations of processes and/or blocks in the flowcharts and/or block diagrams may be implemented through computer program instructions. These computer program instructions may be provided to a processor of a general-purpose computer, a special-purpose computer, an embedded computer or other programmable data processing devices to produce a machine, such that instructions executed through the processor of a computer or other programmable data processing devices produce an apparatus for implementing functions designated in one process or more processes of the flowcharts and/or one block or more blocks of the block diagrams.

These computer program instructions may also be stored in a computer-readable memory which can guide a computer or other programmable data processing devices to work in a specific manner, such that the instructions stored in the computer-readable memory produce a manufactured article including an instruction device, and the instruction device realize functions designated in one process or more processes of the flowcharts and/or one block or more blocks of the block diagrams.

These computer program instructions may also be loaded to a computer or other programmable data processing devices, such that a series of operation steps are executed on the computer or other programmable devices to perform processing realized by the computer, and thus the instructions executed on the computer or other programmable devices provide steps for realizing functions designated in one process or more processes of the flowcharts and/or one block or more blocks of the block diagrams.

The above is just better embodiments of the present document and is not used for limiting the protection scope of the present document.

What we claim is:

1. A method for playing video media, applied to a network side, comprising:
   receiving an audio call request from a calling terminal;
   acquiring video media information that needs to be played in a current call; and playing video media for the calling terminal;
   wherein,
   said receiving an audio call request from a calling terminal comprises:
   receiving a call request from the calling terminal, wherein the call request carries media information, and the media information is audio media information, and said playing video media for the calling terminal comprises:
sending a first message to the calling terminal, wherein the first message carries unreal audio media information;
sending a second message to the calling terminal, wherein the second message carries the video media information that needs to be played in the current call;
receiving a third message from a terminal, wherein the third message carries media information, and the media information is video media information; and
playing the video media that needs to be played for the terminal.

2. The method according to claim 1, wherein, said sending a first message to the calling terminal comprises:
after receiving the call request from the calling terminal, directly sending the first message to the calling terminal, or
after connecting a called terminal according to the call request from the calling terminal, sending the first message to the calling terminal.

3. The method according to claim 1, wherein, said acquiring video media information that needs to be played in a current call comprises:
acquiring the video media information that needs to be played in the current call by querying a preset video media playing policy according to one or more of the following:
a calling number, a called number, a current date, and a current time.

4. The method according to claim 3, wherein, the method further comprises:
stopping playing the video media when a conversation is established, and/or stopping playing the video media according to a playing stop request from the calling terminal.

5. The method according to claim 1, wherein,
the first message is a 183 message, the second message is an UPDATE message, and the third message is a 200 OK UPDATE message.

6. A method for playing video media, applied to a terminal side, comprising:
sending an audio call request to a network side; and
receiving and playing video media from the network side;
wherein,
said sending an audio call request to a network side comprises:
sending a call request to the network side, wherein the call request carries media information, and the media information is audio media information, and
before receiving and playing video media from the network side, the method further comprises:
receiving a first message from the network side, wherein the first message carries unreal audio media information;
receiving a second message from the network side, wherein the second message carries video media information that needs to be played in a current call; and
sending a third message to the network side, wherein the third message carries media information, and the media information is video media information.

7. The method according to claim 6, wherein, the first message is a 183 message, the second message is an UPDATE message, and the third message is a 200 OK UPDATE message.

8. The method according to claim 6, wherein, the method further comprises:

sending a playing stop request to the network side according to a user operation.

9. An apparatus for playing video media, arranged on a network side, wherein the apparatus comprises: a receiving module, an acquisition module and an execution module; wherein,
the receiving module is arranged to receive an audio call request from a calling terminal;
the acquisition module is arranged to acquire video media information that needs to be played in a current call; and
the execution module is arranged to play the video media for the calling terminal;
wherein, the apparatus further comprises a sending module;
the receiving module is arranged to: receive a call request from the calling terminal, wherein the call request carries media information, and the media information is audio media information; and receive a third message from a terminal, wherein the third message carries media information, and the media information is video media information;
the sending module is arranged to, after the receiving module receives the call request from the calling terminal, send a first message to the calling terminal, wherein the first message carries unreal audio media information; and send a second message to the calling terminal, wherein the second message carries the video media information that needs to be played in the current call; and
the execution module is arranged to, after the receiving module receives the third message from the terminal, play the video media that needs to be played for the terminal.

10. The apparatus according to claim 9, wherein,
the sending module is arranged to, after the receiving module receives the call request from the calling terminal, directly send the first message to the calling terminal, or after connecting a called terminal according to the call request from the calling terminal, send the first message to the calling terminal.

11. The apparatus according to claim 9, wherein,
the acquisition module is arranged to acquire the video media information that needs to be played in the current call by querying a preset video media playing policy according to one or more of the following: a calling number, a called number, a current date, and a current time.

12. The apparatus according to claim 9, wherein,
the first message sent by the sending module is a 183 message, the second message is an UPDATE message, and
the third message received by the receiving module is a 200 OK UPDATE message.

13. The apparatus according to claim 9, wherein,
the execution module is further arranged to stop playing the video media when a conversation is established, or,
the receiving module is further arranged to receive a playing stop request from the calling terminal; and
the execution module is further arranged to stop playing the video media according to the playing stop request from the calling terminal.

14. An apparatus for playing video media, arranged on a terminal side, wherein, the apparatus comprises: a sending module and an execution module; wherein,
the sending module is arranged to send an audio call request to a network side; and the execution module is arranged to receive and play video media from the network side;

wherein, the apparatus further comprises a receiving module;

the sending module is arranged to: send a call request to the network side, wherein the call request carries media information, and the media information is audio media information; and, after receiving a second message from the network side, send a third message to the network side, wherein the third message carries media information, and the media information is video media information; and the receiving module is arranged to: receive a first message from the network side, wherein the first message carries unreal audio media information and receive the second message from the network side, wherein the second message carries video media information that needs to be played in a current call.

15. The apparatus according to claim 14, wherein, the first message received by the receiving module is a 183 message, and the second message is an UPDATE message; and the third message sent by the sending module is a 200 OK UPDATE message.

16. The apparatus according to claim 14, wherein, the apparatus further comprises a user interaction module;

the user interaction module is arranged to acquire user operation information; and the sending module is further arranged to send a playing stop request to the network side according to a user operation.

\* \* \* \* \*